United States Patent Office 3,493,861
Patented Feb. 3, 1970

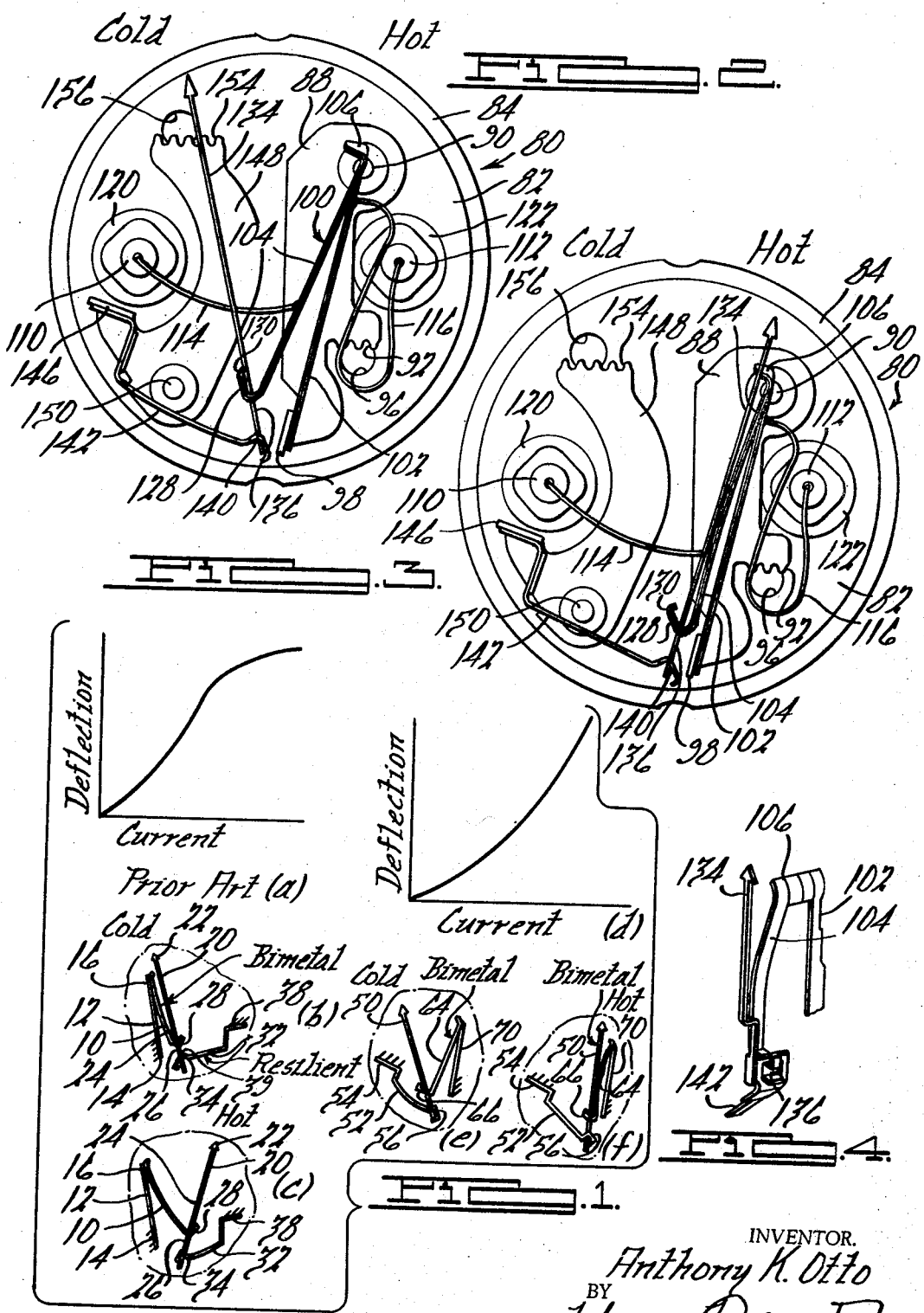

3,493,861
ELECTROTHERMAL GAUGE MECHANISM HAVING NON-LINEAR RESPONSE CHARACTERISTIC
Anthony K. Otto, Ann Arbor, Mich., assignor, by mesne assignments, to Chrysler Corporation, Highland Park, Mich., a corporation of Delaware
Filed Mar. 13, 1967, Ser. No. 622,799
Int. Cl. G01r 5/26
U.S. Cl. 324—106                           2 Claims

ABSTRACT OF THE DISCLOSURE

A remote indicating system including a receiving instrument having a thermoresponsive assembly which is heated at a rate which is responsive to the value of the quantity being measured, as for example a heat indicating meter wherein a pointer is moved by a bimetallic member in response to the sensing of a particular temperature at a remote position. The instrument is further adapted to provide a greater degree of sensitivity at the upper end of the scale, in this case the hot end of the indicating range.

Background and summary of the invention

This invention relates generally to eletrical instruments and more particularly to electrical indicating instruments having improved function response and sensitivity at the high portion of the instrument range.

In prior art indicating systems of the general type to be described, a problem has arisen in the sensitivity of the instrument in the high end of the scale due to prior practices in providing the biasing force for positioning the indicator. In prior systems, the biasing member is positioned to provide relatively negligible force at the zero end of the range and the full force to restrain pointer movement at the high end of the range. The result of this arrangement is a relatively high sensitivity at the zero end and low sensitivity at the high end.

It has been found that the high end sensitivity of the indicating system may be greatly improved by the present invention through modification of the relationships between the thermoresponsive member, the biasing member and the indicating member. A remote indicating system incorporating the features of the present invention provides a greater degree of sensitivity in the higher indicating portion of the scale than heretofore achieved by applying the restraining biasing force at the zero end of the range and relieving the restraining force at the high end. This latter feature has been found to be particularly desirable in an instrument which normally operates in the upper portion of the scale, as for example a temperature remote indicating instrument for use on automobiles.

Accordingly, it is one object of the present invention to provide an improved remote indicating instrument.

It is another object of the present invention to provide an improved remote indicating instrument which has a greater degree of sensitivity in the high portion of the scale.

It is still another object of the present invention to provide the aforementioned improvements while permitting the resulting remote indicating instrument to be of a similar size and simplicity as prior remote indicating instruments.

It is still another object of the present invention to provide an improved remote indicating instrument wherein the relationship between the bias force producing member and the thermoresponsive member as related to the indicating member is changed to relieve the inherent relative insensitivity in the high portion of the scale in prior structures.

It is still a further object of the present invention to provide an improved remote indicating instrument which is highly reliable and has improved calibration characteristics.

Further objects, features and advantages of the invention will become apparent from a consideration of the following description, the appended claims and the accompanying drawing in which:

FIGURE 1 is a composite figure illustrating both the prior art indicator mechanism and the indicator mechanisms of the present invention including diagrams illustrating the deflection versus current curves for both the prior indicator mechanisms and the mechanism of the present invention;

FIGURE 2 is a view, in elevation, of a remote indicating apparatus illustrating the features of the present invention and illustrating the pointer in the cold position;

FIGURE 3 is an elevational view of the indicator mechanism of FIGURE 2 illustrating the pointer in the hot position; and FIGURE 4 is a perspective view of the operating mechanism of FIGURE 3.

Referring now to the drawings and particularly to FIGURE 1(a) to (f) there is illustrated in schematic form a comparison between the prior art remote indicating systems relative to the remote indicating systems of the present invention. FIGURE 1(b) illustrates the conventional remote indicating assembly in the cold position and includes a bimetal actuator 10 which is either self-heated or is heated by means of a heater winding (not shown) electrically connected to a remote sensor and sending mechanism. The remote sensor and sending mechanism normally provides current pulses to heat the bimetal 10 thereby causing the bimetal 10 to deflect in accordance with the average electrical energy being supplied from the remote sender. The bimetal 10 is supported relative to a casing by means of a support member 12 which is anchored at one end 14 to a portion of the housing and at the other end 16 to the bimetal 10.

A pointer member 20 includes an indicating portion 22 and a support portion 24 having an aperture 26 formed therein to receive a generally L-shaped end 28 of the bimetal 10. The L-shaped end 28 acts against the bias of a spring biasing member 32 which forms a pivot point 34 at the lower portion of aperture 26. A second pivot point is formed by means of a hooked portion 39 which bears against an upper edge of the aperture 26, the two pivots coacting to permit the pointer member 20 to pivot through the entire range of the scale. The biasing member 32 is fixed at end 38 to provide a downward bias for pointer 20 and acts to limit movement of the pointer at the hot end of the scale. Accordingly, the spring member 32 is in its most relaxed position when the indicating assembly is in its cold position and the instrument has its greatest sensitivity (greatest needle movement per incremental change in heating) at the cold end.

As the bimetallic member 10 is heated from the remote sender, the bimetal end 28 tends to move to the right and upwardly, thus moving the indicating end 22 of the pointer 20 to the right against the bias of the resilient member 32. As the bimetallic member 10 is further heated, the indicating member 20 achieves its uppermost point as illustrated in FIGURE 1(c). It is to be noted that the biasing member 32 is bent upwardly due to the movement of the bimetallic member 10 to the hot position. Thus the continued movement of the pointer 20 to the right causes an increase in the stress on the resilient member 32 and decrease the sensitivity of the indicator as the upper portion of the scale is traversed.

Referring now to FIGURE 1(a) there is illustrated a curve showing the relationship between deflection and current flow of the bimetallic member 10. As is seen from the curve, an initial degree of heating of the bimetal will cause a deflection of the needle which is relatively large for the first portion of the scale and decreases as the upper end of the scale is approached and the resilient member is stressed. Thus it is seen that the movement of the indicator needle 20 is highly sensitive at the low end of the scale as compared to the sensitivity at the high end.

However, in utilizing the features of the present invention, the deflection versus current curve is greatly improved to provide a greater degree of sensitivity at the high end as shown by the deflection versus current illustrated in FIGURE 1(d). These results may be achieved by means of the assemblies illustrated in FIGURES 1(e) and 1(f) and FIGURES 2 and 3. As is seen from FIGURE 1(e) illustrating the cold position of the indicator mechanism, a pointer 50 is biased to the extreme left by means of a bimetallic element 64 in the cold state and the pointer is restrained from further movement to the left by means of a biasing element 52, which is seen to be in the stressed condition. As in the case with FIGURES 1(b) and 1(c) the biasing element 32 is fixed at end 54 and is connected to the extreme lowermost end of indicator 50 by means of a hook 56. The hook 56 is adapted to pass through an aperture 60 formed in the bottom of the indicator 50. The pivoting of pointer 50 about hook 56 is caused by the heating of a bimetallic element 64, the bimetallic element being heated by means of a remote sender as was the case with FIGURE 1(b). The bimetallic element 64 includes an L-shaped end 66 which is hooked into the aperture 60 to form the second pivot and the opposite end of bimetallic element 64 is fastened to a fixed member 70.

FIGURE 1(f) illustrates the improved indicating mechanism in the hot position wherein the pointer 50 has been pivoted to the extreme right position by the heating of the bimetal 64. Through the heating of the bimetallic element 64 and the indicator 50 moving to the right, the resilient biasing force of the spring member 52 is released thereby relieving the restraining force of spring member 52. Thus, the sensitivity of the instrument is increased at the high end of the scale. In initially calibrating the indicating mechanism, the biasing member 52 is stressed to a predetermined degree to provide the biasing force against which the bimetallic element is working. As the bimetallic element bends in response to heating thereof, this resilient force is relieved in a smooth manner until such time as the minimal biasing force is present.

From the foregoing description it will be noted that the restraining force due to the bending of the resilient member is greatest at the hot end in the prior construction and is relaxed at the cold end. In the improved construction, the opposite is true and the greatest amount of restraining force occurs at the cold end and is relieved as the pointer 50 moves toward the hot end. Thus, the mechanism is rendered more sensitive than the prior construction at the hot end of the range.

Referring now to FIGURES 2, 3 and 4, there is illustrated a preferred embodiment of specific elements assembled to incorporate the features of the present invention. An indicating instrument 80 includes a cup-shaped housing and base member 82 within which are supported certain operating elements of the indicating instrument. A suitable dial (not shown) may be supported by a rim 84 or flange of the cup-shaped housing so that an indicating hand projecting through an opening in the dial will provide the desired indication. An arm 88 is pivotally mounted on the base of the housing. The arm 88 is pivotally mounted and frictionally secured in position on the base 82 by a rivet 90. The arm 88 is provided with a gear sector portion 92 located at a distance from the pivot point 90 and positioned adjacent an aperture 96 in the base 82. By inserting a gear tool from the bottom of the housing into the opening 96, the gear sector portion 92 of the arm 88 may be engaged and, by rotation of the tool, the arm 88 may be moved to a predetermined position during initial adjustment of the instrument.

Adjacent the outermost end of the arm 12, there is provided an upstanding flange portion 98, to which is secured a bimetallic member 100. The bimetallic member 100 is formed of a generally U-shaped configuration in a plane perpendicular to the plane of the drawing and includes an ambient compensating leg 102, a heated leg 104 and an interconnecting portion 106. The means for heating leg 104 is electrically connected between a pair of conductor studs 110 and 112 by means of conductors 114 and 116, the studs being secured to the base 82 by means of suitable insulating washers 120, 122.

In order to prevent the interconnecting portion 106 from having a movement or action, it has been found preferable to provide a curved or stiffening portion for the interconnecting leg 106. A transverse bimetallic portion 128 is provided adjacent the end of the bimetallic leg 104 which terminates in a hooked portion 130, the transverse portion 128 and hooked portion 13 providing a first pivotal connection between the bimetallic leg 104 and a pointer 134.

The indicating instrument is provided with an indicating hand 134, the pointer portion of which extends above the dial secured to the flange or the rim of the cup-shaped housing, the pointer having right angle bends therein to permit the pointer portion to extend above the dial. The indicating member 134 is provided adjacent the end thereof with an aperture 136 which is adapted to receive the hooked end of bimetallic member 104. Thus, the indicating member 134 is pivotally mounted by means of the aperture 34 by having one side of the aperture 136 engaging the leg 128 of the bimetal 104 and having the other side of the aperture 136 engaging a hook portion 140 of a spring supporting member 142. the indicating hand 134, therefore, is pivotally supported by two knife edge supports.

The spring support member 142 is connected by a suitable fastening means to an upstanding portion 146 of a pivotally mounted arm 148. The arm 148 is provided with a pivot fastening means 150 to pivotally and frictionally secure the arm 148 to the bottom of the housing 82. Adjacent the outer end of the arm 148 is provided a gear sector 154 positioned adjacent an aperture 156 in the base of the housing 82 so that the arm 148 may be moved to a particular position during the initial adjustment of the instrument by inserting a tool through the aperture 156.

As described above, when electrical pulses of energy are applied to terminals 110, 112, the bimetallic element 104 is heated to a degree determined by the average value of the energy being supplied to the bimetallic element 104. The bimetal is illustrated as being a self-heating bimetal in FIGURES 2 and 3, but it is to be understood that a heater winding may be provided to heat the portion 104, as illustrated in FIGURE 4. As heat is applied, the portion 104 starts to deflect thereby moving the pointer 134 to the right. It is to be noted that the spring biasing element 142 is in the most stressed condition at such time as zero heat is being applied to bimetal 104. The heating of bimetal 104 may be continued in accordance wiht the condition of the sensing element (not shown) until such time as the extreme end of the scale is reached, as particularly illustrated in FIGURE 3, wherein the biasing element 142 is in its relaxed state and the bimetal 104 is in its extreme deflected state.

The movement of the mechanism illustratd in FIGURES 2, 3 and 4 corresponds to the deflection versus current curve illustrated in FIGURE 1(d) and it is to be noted that greater high scale sensitivity is provided with the improved mechanism described.

What is claimed is:

1. An electrothermal indicating instrument exhibiting an increased indicating response characteristic at one end of the indicating range thereof, said instrument comprising an indicating element,
- means for driving said indicating element in response to a sensed condition to be indicated and including
  - a bimetallic element, and
    - a heating element located in heat transfer relationship with said bimetallic element and adapted to receive heating energy in response to the sensed condition,
  - said bimetallic element having
    - a fixed end, and
      - another end displaceable relative to its fixed end in response to the heating of said bimetallic element, and
- means restrictively controlling the movement of said indicating element over said indicating range including
  - biasing means having a fixed end and a displaceable end, the displaceable ends of said bimetallic element and said biasing means pivotally coupled to said indicating element at a pair of spaced apart points thereon,
- said bimetallic element and said biasing means supporting and orienting the indicating element in a position relative thereto in which the rate of restriction presented by the biasing means to the movement of the bimetallic element and the indicating element varies inversely with the heating of the bimetallic element as the indicating element is driven toward the said end of the indicating range thereof.

2. An electrothermal indicating instrument of the character described in claim 1 above wherein the rate of restriction presented by the biasing means to the movement of the bimetallic element and the indicating element decreases with increased heating of the bimetallic element and wherein any change in the bias provided by the biasing means as the indicating element is driven toward the said end of the indicating range is in a direction to reduce the restriction to movement of the bimetallic element presented by the biasing means.

References Cited

UNITED STATES PATENTS 2,910,650   10/1959   Boddy _____ 324—106 XR

ALFRED E. SMITH, Primary Examiner

U.S. Cl. X.R.

73—363